(12) United States Patent
Choi

(10) Patent No.: US 12,316,275 B2
(45) Date of Patent: May 27, 2025

(54) INTELLIGENT PHOTOVOLTAIC MODULE CONTROLLER AND CONTROL METHOD THEREOF

(71) Applicant: TIMEROBOT CO., LTD., Incheon (KR)

(72) Inventor: Bong Jin Choi, Seoul (KR)

(73) Assignee: TIMEROBOT CO., LTD., Incheon (KR)

( * ) Notice: Subject to any disclaimer, the term of this patent is extended or adjusted under 35 U.S.C. 154(b) by 0 days.

(21) Appl. No.: 18/284,526

(22) PCT Filed: Aug. 30, 2021

(86) PCT No.: PCT/KR2021/011577
§ 371 (c)(1),
(2) Date: Sep. 27, 2023

(87) PCT Pub. No.: WO2022/211191
PCT Pub. Date: Oct. 6, 2022

(65) Prior Publication Data
US 2025/0030380 A1   Jan. 23, 2025

(30) Foreign Application Priority Data

Apr. 1, 2021 (KR) .......... 10-2021-0042568
Aug. 20, 2021 (KR) .......... 10-2021-0110283

(51) Int. Cl.
*H02S 40/36* (2014.01)
*H02J 3/38* (2006.01)

(52) U.S. Cl.
CPC .............. *H02S 40/36* (2014.12); *H02J 3/381* (2013.01); *H02J 2300/26* (2020.01)

(58) Field of Classification Search
CPC ... H02S 40/36; H02J 3/38; H02J 3/381; H02J 2300/26
See application file for complete search history.

(56) References Cited

U.S. PATENT DOCUMENTS

2015/0364918 A1   12/2015   Singh et al.

FOREIGN PATENT DOCUMENTS

| JP | 5738383 | 6/2015 |
|---|---|---|
| KR | 101160126 | 6/2012 |
| KR | 20130048196 | 5/2013 |
| KR | 20140064859 | 5/2014 |
| KR | 20210043401 | 4/2021 |

*Primary Examiner* — Robert L Deberadinis
(74) *Attorney, Agent, or Firm* — JCIPRNET

(57) ABSTRACT

Disclosed herein are an intelligent photovoltaic module controller used in a photovoltaic power generation system to connect two photovoltaic modules in series or in parallel and a method for controlling the same. According to the present invention, it is possible to maximize power generation efficiency by controlling series/parallel connection based on changes in current flowing through a pair of external connection terminals of the photovoltaic module controller or a string connecting multiple photovoltaic module controllers in series.

16 Claims, 4 Drawing Sheets

[FIG. 1]
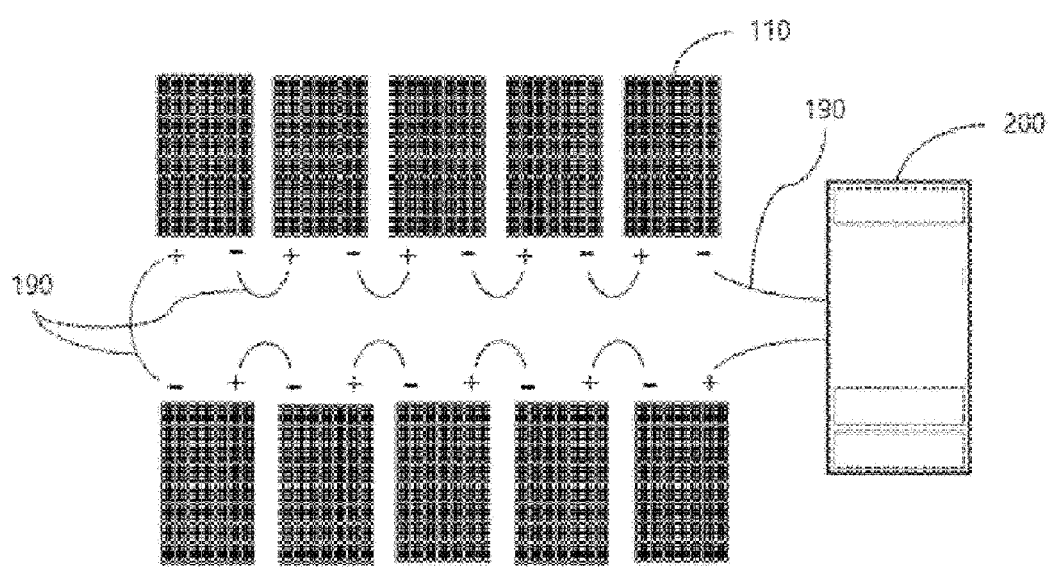

[FIG. 2]
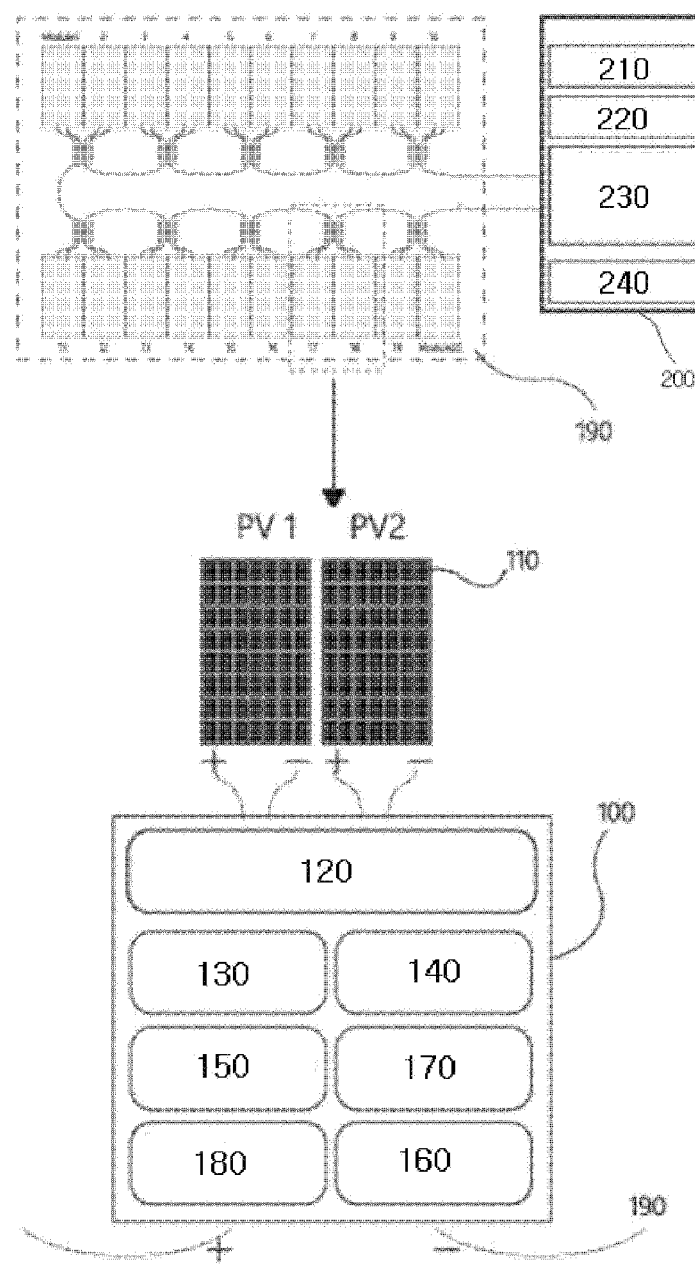

[FIG. 3]
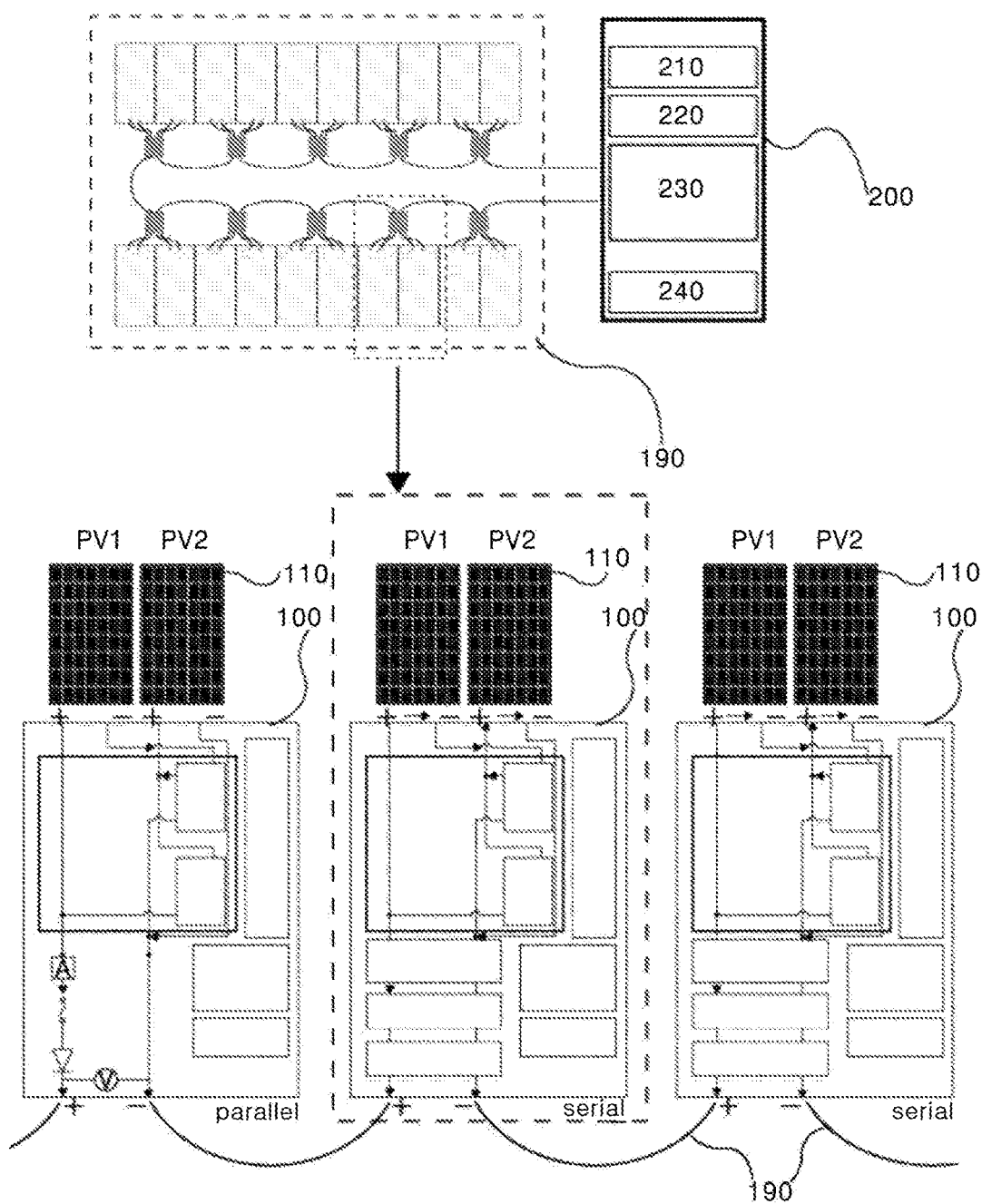

[FIG. 4]
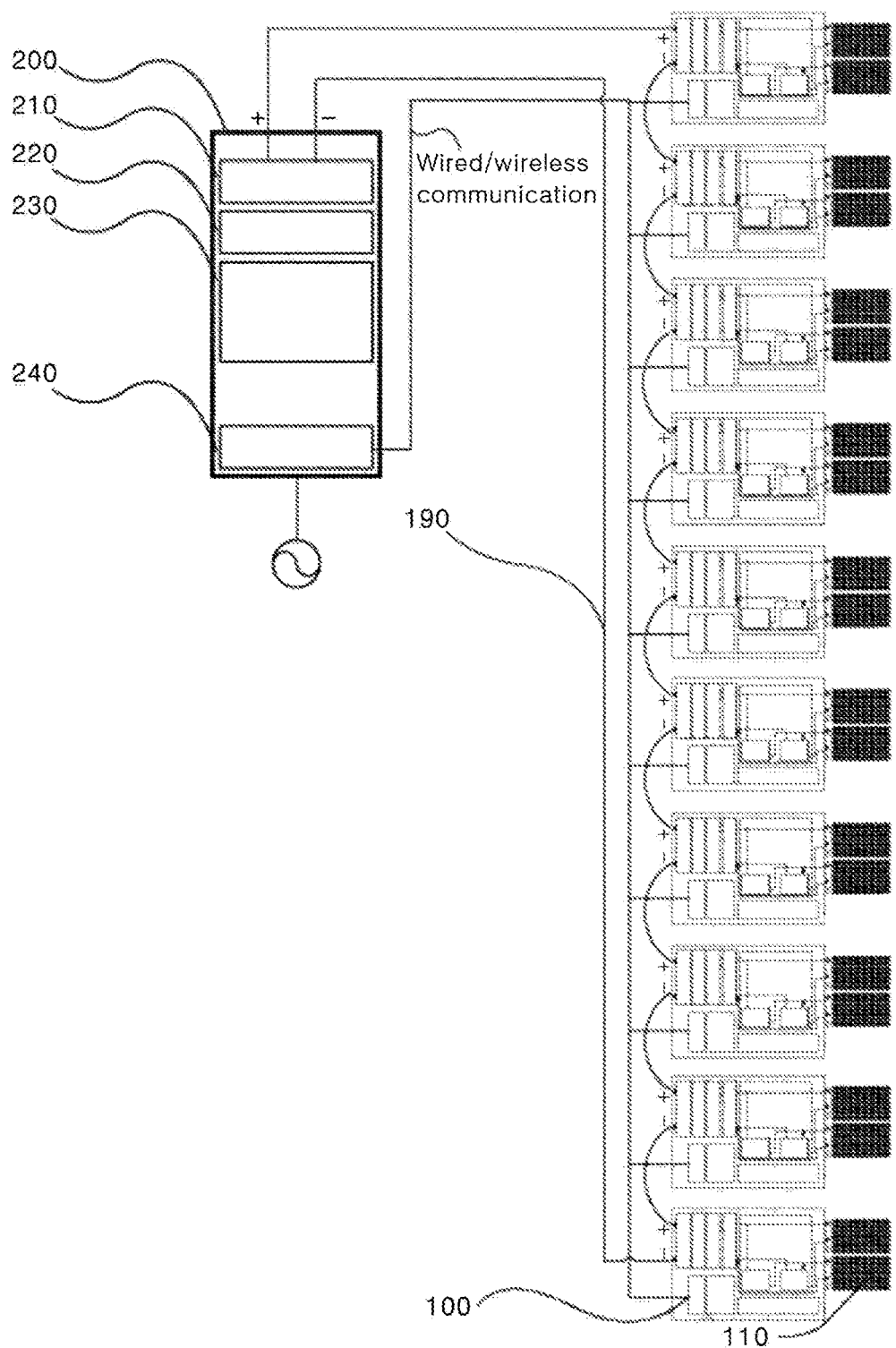

INTELLIGENT PHOTOVOLTAIC MODULE CONTROLLER AND CONTROL METHOD THEREOF

TECHNICAL FIELD

The present invention relates to an intelligent photovoltaic module controller that can maximize power generation efficiency of a photovoltaic power generation system in which multiple photovoltaic modules are arranged by switching electrical connection between the photovoltaic modules in response to a control signal and a method for controlling the same.

BACKGROUND ART

A basic unit that generates direct current electricity from sunlight is called a cell, and multiple cells are connected to form a module, which is a basic unit from which electricity is drawn. In general, a photovoltaic power generation system includes one or more arrays of multiple photovoltaic modules connected in series and a power converter converting DC to DC power or AC power. FIG. 1 is a schematic diagram of a conventional photovoltaic power system.

A photovoltaic module is designed with multiple cells connected in series or parallel to produce a desired amount of power. Under international standard test conditions (incident irradiance: 1,000 W/m, solar cell temperature: 25° C., atmospheric mass: 1.5), the magnitude of open voltage generated by a single cell is about 0.5 V to 0.6 V and the magnitude of short-circuit current generated by the cell is about 8 A, although varying depending on the size and quality thereof. The most important factors influencing voltage-current characteristics of electricity generated by a photovoltaic module are temperature and insolation. As the temperature increases, a voltage generated by the photovoltaic module decreases, and as the temperature decreases, the voltage increases. For example, in the case of silicon solar cells, energy conversion efficiency is known to decrease by about 0.4% for every 1° C. increase in temperature. If the surface temperature of cells rises to 60° C. to 70° C. in the summer, a power generation rate can decrease due to reduction in generated voltage per cell despite there being enough insolation. For a given voltage, a current that a photovoltaic module allows to flow is proportional to insolation. That is, the current increases with increasing insolation. However, once a maximum current allowed to flow through a cell is reached, the current can no longer increase despite increase in insolation. Accordingly, an ideal maximum power is produced by allowing a maximum current to flow through the cell at a maximum voltage level.

A photovoltaic module includes a large number of cells connected in series. If a certain cell does not receive enough sunlight and a current flowing therethrough decreases, the cell becomes a "bottleneck" acting as a load to other cells. If decrease in current occurs in any of multiple cells connected in series, this reduces a total current of a line of cells connected in series, resulting in significant reduction in power generation efficiency and, in severe cases, causing damage to the cell due to occurrence of a hot spot. Heat from a faulty cell can cause secondary failures to the entire module. In order to avoid these problems, cells may be grouped into several groups to provide a bypass circuit that allows current to bypass cells in a group including a faulty cell, and a reverse current protection diode may be provided to prevent reverse current due to decrease in voltage generated by the photovoltaic module.

Voltage-current fluctuations of a photovoltaic module caused by changes in insolation/temperature due to weather, shadows, pollution, etc. or occurrence of accidents or faults are important factors making photovoltaic power generation less efficient. A current-voltage relationship allowing production of a maximum power is variable. Accordingly, various maximum power point tracking (MPPT) control methods are known in the art to increase the overall power generation efficiency of a photovoltaic power generation system under varying conditions. For example, Korean Patent Laid-open Publication (KR) No. 10-2013-0025286 discloses technology that controls a power inverter to track a maximum power point.

However, even when the power converter is controlled to track the maximum power point, operation of the power converter is bound to be interrupted in a situation where a voltage generated by a photovoltaic module array drops below the operating range of the power converter. When energy conversion efficiency of cells constituting a photovoltaic module decreases due to a high-temperature event or decrease in insolation caused by changes in weather conditions, an undervoltage trip device of the power converter is operated for a certain period of time (for example, 5 minutes) to protect internal circuits thereof. As a result, power generation is impossible even under suitable weather conditions for power generation, causing reduction in overall energy efficiency of photovoltaic power generation and damage to or decrease in lifespan of an overloaded internal circuit of the power converter due to an electrical surge or an arc that can occur during operation of the undervoltage trip device. In this regard. Korean Patent Laid-open Publication (KR) No. 10-2011-0038975 discloses technology that enables a main solar cell module and an auxiliary solar cell module to be connected either in series or in parallel depending on the total output voltage of a solar cell module such that the total output voltage of the solar cell module can be maintained within the normal operating range of a power converter (an inverter). However, this technology has a problem in that a separate auxiliary battery or voltage booster is required and voltage support using such as device is only provided temporarily for the purpose of preventing the power converter from being stopped.

If a power generation rate of a certain photovoltaic module is reduced due to shadowing caused by clouds, contamination of a cell surface, faults, etc. and the photovoltaic module acts as a bottleneck that limits the flow of current, this can cause reduction in total current of an array of photovoltaic modules connected in series to the photovoltaic module and thus decrease in overall power generation efficiency. In this case, even when a voltage of the array is temporarily increased, loss of power generated by other normal photovoltaic modules is unavoidable. In this regard. Korean Patent Registration (KR) No. 10-1743908 discloses management technology that allows efficient and uninterrupted operation of a photovoltaic power generation system by installing a sensor module and a bypass circuit on each photovoltaic module to exclude (bypass) a defective or malfunctioning photovoltaic module from a power generation line. In order to perform control for bypassing a defective or malfunctioning photovoltaic module, each photovoltaic module needs to be provided with a bypass switch circuit and a sensor for monitoring a condition (faults) of the photovoltaic module, which leads to cost increase and thus reduction in profitability of the photovoltaic power generation system. Although the current produced by each photovoltaic module is sensitive to conditions, such as weather, environmental changes, and faults, the same current (total current) flows through each photovoltaic module connected in series on a string. Accordingly, even when the current produced by a certain photovoltaic module decreases, it is difficult to determine which photovoltaic module is responsible for decrease in total current. In addition, since the effect of the aforementioned conditions on voltage is relatively small and a change in voltage does not necessarily lead to decrease in total current, monitoring the voltage generated by each photovoltaic module is not sufficient to determine which photovoltaic module is responsible for decrease in total current.

DISCLOSURE

Technical Problem

The present invention has been conceived to solve such problems in the art and it is one object of the present invention to provide an intelligent photovoltaic module controller which can switch electrical connection between photovoltaic modules to series or parallel connection, thereby ensuring more efficient photovoltaic power generation and easier maintenance without detecting voltage or current of individual photovoltaic modules.

It is another object of the present invention to provide a method for controlling the intelligent photovoltaic module controller, which enables photovoltaic modules to be electrically connected in series or in parallel, thereby ensuring more efficient photovoltaic power generation and easier maintenance.

Technical Solution

In accordance with one aspect of the present invention, there is provided an intelligent photovoltaic module controller for switching electrical connection between photovoltaic modules each comprising multiple solar cells connected to one another. The intelligent photovoltaic module controller includes: a first pair of input terminals electrically connected to positive (+) and negative (−) terminals of a first photovoltaic module, respectively; a second pair of input terminals electrically connected to positive (+) and negative (−) terminals of a second photovoltaic module, respectively; a pair of positive (+) and negative (−) external connection terminals electrically connected to a power converter or electrically connected in series to another intelligent photovoltaic module controller; a series circuit connected between the first pair of input terminals, the second pair of input terminals, and the pair of external connection terminals such that one terminal of the first pair of input terminals is electrically connected to one terminal of the second pair of input terminals having an opposite polarity thereto and the other terminals of the first and second pairs of input terminals are electrically connected to the positive (+) and negative (−) external connection terminals, respectively; a parallel circuit connected between the first pair of input terminals, the second pair of input terminals, and the pair of external connection terminals such that the positive (+) and negative (−) terminals of the first pair of input terminals are electrically connected to the positive (+) and negative (−) terminals of the second pair of input terminals, respectively, which, in turn, are electrically connected to the positive (+) and negative (−) external connection terminals, respectively; a switch circuit performing switching operation to connect a selected one of the series circuit and the parallel circuit between the first pair of input terminals, the second pair of input terminals, and the pair of external connection terminals; and a control unit controlling the switch circuit to perform switching between series connection and parallel connection, wherein, when electrical connection between the first and second photovoltaic modules is switched from the series circuit to the parallel circuit, determination as to whether to switch electrical connection between the first and second photovoltaic modules back to the series circuit is made based on changes in current flowing through the pair of external connection terminals or a string connected to the pair of external connection terminals due to switching to the parallel circuit.

The intelligent photovoltaic module controller may further include: a current sensor detecting a magnitude of current flowing through the pair of external connection terminals.

The intelligent photovoltaic module controller may further include: a voltage sensor detecting a magnitude of voltage applied between the pair of external connection terminals.

When the control unit controls switching operation of the switch circuit such that the parallel circuit is connected between the first and second photovoltaic modules, the control unit may compare a magnitude of current detected by the current sensor with a magnitude of current detected before circuit switching and may independently control switching operation of the switch circuit such that, when the magnitude of current measured after switching to the parallel circuit is increased by a predetermined value or more compared to the magnitude of current measured before switching to the parallel circuit, the first and second photovoltaic modules are allowed to stay connected in parallel and, when the magnitude of current measured after switching to the parallel circuit is increased by less than the predetermined value compared to the magnitude of current measured before switching to the parallel circuit, the first and second photovoltaic modules are connected back to the series circuit.

The control unit may control switching operation of the switch circuit such that the first and second photovoltaic modules are periodically connected to the parallel circuit at a predetermined time interval to check a status of power generation.

The intelligent photovoltaic module controller may further include: a communication unit communicating with the power converter and having a unique identification code (ID), wherein, when the communication unit receives a circuit control command, the control unit may control switching operation of the switch circuit in response to the circuit control command.

The intelligent photovoltaic module controller may further include: a power supply unit connected to the first and second pairs of input terminals to supply power required for operation of internal components of the intelligent photovoltaic module controller.

The intelligent photovoltaic module controller may further include: a reverse current prevention circuit connected to the pair of external connection terminals to prevent reverse current from flowing from outside, the reverse current prevention circuit comprising a fuse or PTC thermistor to provide protection from overpower due to a fault or accident.

In accordance with another aspect of the present invention, there is provided a method for controlling an intelligent photovoltaic module controller switching electrical connection between photovoltaic modules each comprising multiple solar cells connected to one another, wherein the intelligent photovoltaic module controller includes: a first pair of input terminals electrically connected to positive (+) and negative (−) terminals of a first photovoltaic module, respectively; a second pair of input terminals electrically connected to positive (+) and negative (−) terminals of a second photovoltaic module, respectively; a pair of positive (+) and negative (−) external connection terminals electrically connected to a power converter or electrically connected in series to another intelligent photovoltaic module controller; a series circuit connected between the first pair of input terminals, the second pair of input terminals, and the pair of external connection terminals such that one terminal of the first pair of input terminals is electrically connected to one terminal of the second pair of input terminals having an opposite polarity thereto and the other terminals of the first and second pairs of input terminals are electrically connected to the positive (+) and negative (−) external connection terminals, respectively; a parallel circuit connected between the first pair of input terminals, the second pair of input terminals, and the pair of external connection terminals such that the positive (+) and negative (−) terminals of the first pair of input terminals are electrically connected to the positive (+) and negative (−) terminals of the second pair of input terminals, respectively, which, in turn, are electrically connected to the positive (+) and negative (−) external connection terminals, respectively; a switch circuit performing switching operation to connect a selected one of the series circuit and the parallel circuit between the first pair of input terminals, the second pair of input terminals, and the pair of external connection terminals; and a control unit controlling the switch circuit to perform switching between series connection and parallel connection. The method includes: detecting a change in current flowing through the pair of external connection terminals when the switch circuit switches electrical connection between the first and second photovoltaic modules from the series circuit to the parallel circuit; and determining whether to connect the first and second photovoltaic modules back to the series circuit based on the detected change in current.

The step of determining whether to connect the first and second photovoltaic module back to the series circuit may include: allowing the first and second photovoltaic modules to stay connected to the parallel circuit when a magnitude of current measured after switching to the parallel circuit is increased by a predetermined value or more compared to a magnitude of current measured before switching to the parallel circuit; and connecting the first and second photovoltaic modules back to the series circuit when a magnitude of current measured after switching to the parallel circuit is increased by less than the predetermined value compared to a magnitude of current measured before switching to the parallel circuit.

The step of detecting a change in current may include detecting a change in current flowing through a string connected to the pair of external connection terminals of the intelligent photovoltaic module controller.

The method may further include: controlling, by a control unit of the power converter, switching operation of the switch circuit such that the first and second photovoltaic modules are periodically connected to the parallel circuit at a predetermined time interval to check a status of power generation.

The intelligent photovoltaic module controller may further include: a communication unit communicating with the power converter and having a unique identification code (ID) and, when the communication unit receives a circuit control command, the control unit may control switching operation of the switch circuit in response to the circuit control command.

The method may further include: communicating with at least two intelligent photovoltaic module controllers installed on the power converter and connected in series via a string connected to respective pairs of external connection terminals thereof to remotely control the at least two intelligent photovoltaic module controllers, wherein the step of determining whether to connect the first and second photovoltaic modules back to the series circuit may include: allowing the first and second photovoltaic modules to stay connected to the parallel circuit when a magnitude of current measured after switching to the parallel circuit is increased by a predetermined value or more compared to a magnitude of current measured before switching to the parallel circuit; and connecting the first and second photovoltaic modules back to the series circuit when a magnitude of current measured after switching to the parallel circuit is increased by less than the predetermined value compared to a magnitude of current measured before switching to the parallel circuit, and, when the first and second photovoltaic modules are allowed to stay connected to the parallel circuit, a corresponding intelligent photovoltaic module controller may be identified by the unique identification code (ID) to provide information about a status of power generation.

The step of detecting a change in current flowing through the pair of external connection terminals may include detecting, by a sensor unit of the power converter, a change in current flowing through the string connecting the at least two intelligent photovoltaic module controllers in series to control each of the intelligent photovoltaic module controllers based thereon.

The power converter may inform an administrator at a remote location of an abnormal situation subject to predetermined conditions or may provide information in response to a query from a remote location.

Advantageous Effects

The intelligent photovoltaic module controller according to the present invention can adaptively switch electrical connection between photovoltaic modules to series or parallel to track a maximum power point in response to a situation where the magnitude of voltage/current of a certain photovoltaic module decreases due to various causes such as weather changes, temperature, pollution, and faults. The intelligent photovoltaic module controller is useful for an array of photovoltaic modules connected via a single string, and may also be installed as an add-on to an existing photovoltaic power generation system.

According to the present invention, connection between photovoltaic modules can be switched between series and parallel in real time based on detection and analysis of voltage or current of each intelligent photovoltaic module controller and it is possible to easily identify a photovoltaic module with a problem to take necessary actions based on measured voltage or current information.

According to the present invention, a power converter can continue to operate in MPPT mode by series/parallel switching of electrical connection between photovoltaic modules, thereby reducing the number of times operation of the power converter is interrupted and thus improving power generation efficiency and preventing reduction in service life and failure of the power converter.

DESCRIPTION OF DRAWINGS

The above and other aspects, features, and advantages of the present invention will become apparent from the detailed description of the following embodiments in conjunction with the accompanying drawings:

FIG. 1 is a schematic diagram of a conventional photovoltaic power system;

FIG. 2 is a diagram of a power converter controlling an intelligent photovoltaic module controller for series/parallel switching according to the present invention;

FIG. 3 is a diagram of the intelligent photovoltaic module controller for series/parallel switching and the power converter according to the present invention; and FIG. 4 is a diagram illustrating one embodiment of the power converter controlling the intelligent photovoltaic module controller according to the present invention.

MODE FOR INVENTION

Hereinafter, exemplary embodiments of the present invention will be described with reference to the accompanying drawings. It should be understood that the present invention is not limited thereto and may be embodied in different ways. The following embodiments are provided for complete disclosure and thorough understanding of the present invention by those skilled in the art. It should be noted that like components will be denoted by like reference numerals throughout the specification.

In addition, description of known functions and constructions which may unnecessarily obscure the subject matter of the present invention will be omitted. It will be understood that elements shown in the drawings are not necessarily drawn to scale for descriptive convenience and clarity. For example, the dimensions of some of the elements may be exaggerated relative to other elements for clarity. However, it will be understood by those skilled in the art that the present invention may be practiced without these specific details.

FIG. 2 is a diagram of a power converter controlling an intelligent photovoltaic module controller according to the present invention, wherein the intelligent photovoltaic module controller can switch electrical connection between two photovoltaic modules to series or parallel connection. The intelligent photovoltaic module controller 100 according one embodiment of the present invention includes: two pairs of input terminals electrically connected to pairs of positive (+) and negative (−) terminals of the two photovoltaic modules, respectively; and a pair of positive (+) and negative (−) external connection terminals electrically connected in series to a neighboring power converter or another intelligent photovoltaic controller. Respective pairs of external connection terminals of multiple intelligent photovoltaic module controllers 100 are connected in series to form a photovoltaic module array, wherein an output voltage of the array is equal to the sum of voltages across the respective pairs of external connection terminals of the multiple photovoltaic module controllers.

For example, when two photovoltaic modules each having an output voltage of 40 V are connected in series, a voltage across the pair of external connection terminals of the photovoltaic module controller at steady state is 80 V and an output voltage of an array of 10 such photovoltaic module controllers connected in series is 800 V. Since the photovoltaic module controllers are all connected in series, the same magnitude of current flows through each photovoltaic module in the array. Assuming a current of 10 A flows through each photovoltaic module in the array, a total generated power is 800 V×10 A=8000 W. If electrical connection between two photovoltaic modules connected to each photovoltaic module controller is switched to parallel connection, an output voltage of the array is 400 V and an output current of the array is 20 A. Thus, a total generated power is 400 V×20 A=8000 W, which is equal to the total generated power when the photovoltaic modules in the array are all connected in parallel if there is no problem with any of the photovoltaic modules. However, if any one of the photovoltaic module controllers connects two photovoltaic modules connected thereto in series, a total current of the array is limited to 10 A, which corresponds to a current of one photovoltaic module.

A series/parallel switching circuit unit 120 includes: a series circuit, a parallel circuit, and a switch circuit performing switching between the series circuit and the parallel circuit. The series circuit is connected between a first pair of input terminals, a second pair of input terminals, and the pair of external connection terminals of the photovoltaic module controller 100 connected to the two photovoltaic modules such that one terminal of the first pair of input terminals is electrically connected to one terminal of the second pair of input terminals having an opposite polarity thereto and the other terminals of the first and second pairs of input terminals are electrically connected to the positive (+) and negative (−) external connection terminals, respectively. The parallel circuit is connected between the first pair of input terminals, the second pair of input terminals, and the pair of external connection terminals such that the positive (+) and negative (−) terminals of the first pair of input terminals are electrically connected to the positive (+) and negative (−) terminals of the second pair of input terminals, respectively, which, in turn, are electrically connected to the positive (+) and negative (−) external connection terminals, respectively. The switch circuit performs switching operation to connect a selected one of the series circuit and the parallel circuit between the first pair of input terminals, the second pair of input terminals, and the pair of external connection terminals in response to a signal from a control unit 130.

The intelligent photovoltaic module controller may control switching operation for switching between series connection and parallel connection based on monitoring of the power generation status of the photovoltaic modules through detection of current or voltage across the pair of external connection terminals. The control unit 130 may compare the magnitude of current or voltage detected upon circuit switching with the magnitude of current or voltage detected before circuit switching. The magnitude of current or voltage detected before circuit switching may be stored in a corresponding sensor to be transmitted to the control unit as needed, or may be transmitted to and stored in the control unit. The control unit 130 may independently control switching operation of the switch circuit for switching between series connection and parallel connection subject to predetermined conditions, or may control switching operation in response to a command from the power converter 200 when the intelligent photovoltaic module controller includes a communication unit 160. Since a total voltage of the photovoltaic module array needs to be higher than a predetermined minimum operating voltage of the power converter 200 in order for the power converter 200 to continue to operate without interruption, when the total voltage of the array drops below the predetermined minimum operating voltage due to effects of sunrise, sunset, weather, etc., every switch circuit connected to the parallel circuit may be controlled to be connected to the series circuit.

A current sensor 140 detects a current flowing through the pair of external connection terminals. Current information detected when the switch circuit connects the parallel circuit between the two photovoltaic modules may be transmitted to the control unit to determine whether the switch circuit needs to perform switching to the series circuit or the parallel circuit, or may be transmitted to the power converter via a communication unit. The power converter may collectively control all intelligent photovoltaic module controllers connected thereto. The power converter and the intelligent photovoltaic module controller may communicate with each other via a wired or wireless network.

If a problem occurs in one of two photovoltaic modules connected to the photovoltaic module controller, this can significantly influence the magnitude of current generated by the photovoltaic module with the problem. Accordingly, the magnitude of current flowing through the pair of external connection terminals is measured when the two photovoltaic modules are connected to the parallel circuit to be compared with the magnitude of current stored before circuit switching. If the measured magnitude of current is greater than the stored magnitude of current, this indicates that there is a problem with the power generation status of the photovoltaic modules. Even when some photovoltaic modules in the photovoltaic module array are connected to the parallel circuit, a maximum current flowing through the other photovoltaic modules connected to the series circuit does not increase. Accordingly, in a normal situation, even when one intelligent photovoltaic module controller performs switching from the series circuit to the parallel circuit, a total current flowing through the pair of external connection terminals does not increase. However, in a situation where one of the two photovoltaic modules connected to the photovoltaic module controller acts as a bottleneck in the flow of current, switching the two photovoltaic modules to parallel connection can increase a total current flowing through the pair of external connection terminals. As such, decrease in current produced by one photovoltaic module in the photovoltaic module array connected in series causes the magnitude of total current of the array to be limited to a small value, a loss of generated power is incurred due to decrease in total current even when the other photovoltaic modules operate normally. Accordingly, when the magnitude of current detected by the current sensor 140 after switching to the parallel circuit is greater than the magnitude of current before circuit switching, the switch circuit may be controlled to allow the two photovoltaic modules to stay connected in parallel, thereby preventing the total current of the array from being limited to a small value. Determination as to whether to control the switch circuit to perform switching to the series circuit or allow the two photovoltaic modules to stay connected in parallel may be made based on comparison of a power loss resulting from decrease in total voltage of the array caused by allowing the two photovoltaic modules to stay connected in parallel with a power loss resulting from a situation where the total current of the array is limited to a small value and a current across the other photovoltaic modules operating normally is thus also limited when the two photovoltaic modules are switched back to series connection.

Without comparing the magnitudes of current before and after switching to parallel connection, it is difficult to determine which photovoltaic module is responsible for decrease in current when the photovoltaic modules in the array are connected to the series circuit. Accordingly, a current value detected by the current sensor needs to be temporarily stored. The control unit 130 controls the switch circuit such that the two photovoltaic modules are periodically connected to the parallel circuit at a predetermined time interval and the current sensor 140 detects a current flowing through the pair of external connection terminals of the intelligent photovoltaic module controller. Such a circuit switching operation for checking the power generation status may be performed independently by each intelligent photovoltaic module controller, or may be performed sequentially by each photovoltaic module controller based on interaction with other photovoltaic module controllers or in response to a command from the power converter when the intelligent photovoltaic module includes a communication unit 160. Even if there is a voltage difference between photovoltaic modules connected in parallel, this does not cause reverse current since typical commercially available photovoltaic modules are provided with a reverse current prevention circuit.

The intelligent photovoltaic module controller may further include a voltage sensor 150. When first and second pairs of input terminals of each photovoltaic module are connected to the series circuit, the voltage sensor 150 detects the magnitude of voltage applied between the pair of external connection terminals. If the detected magnitude of voltage is less than a predetermined value, this indicates that there is a problem with the power generation status of the photovoltaic module. When there is some difference in insolation between photovoltaic modules, the magnitude of generated voltage is less sensitive thereto than the magnitude of generated current. If the detected magnitude of voltage is significantly low, there is a high possibility that the magnitude of current has also decreased. Accordingly, the control unit 130 controls the switch circuit to connect the first and second pairs of input terminals to the parallel circuit and the current sensor 140 detects the magnitude of current flowing through the pair of external connection terminals. If there is no significant difference in magnitude of current between before and after switching to parallel connection, the control unit 130 controls the switch circuit to reconnect the first and second pairs of input terminals to the series circuit. When an output voltage of the array drops below a minimum voltage required for the power converter due to sunset or the like and operation of the power converter is interrupted, the switch circuit of each intelligent photovoltaic module controller is stopped while connected to the series circuit.

The power converter controlling the intelligent photovoltaic module controller according to the present invention may control switching operation for switching between series connection and parallel connection as needed based on monitoring of the power generation status of the photovoltaic modules through detection of current or voltage across the pair of external connection terminals. A control unit 220 may compare the magnitude of current or voltage detected upon circuit switching with the magnitude of current or voltage detected before circuit switching. The magnitude of current or voltage detected before circuit switching may be stored in a sensor unit 210 to be transmitted to the control unit 220 as needed, or may be transmitted to and stored in the control unit 220. The control unit 220 may independently control switching operation of the switch circuit for switching between series connection and parallel connection subject to predetermined conditions, or may control switching operation in response to a command from the power converter 200 when the intelligent photovoltaic module controller includes a communication unit 160. Since a total voltage of the photovoltaic module array needs to be higher than a predetermined minimum operating voltage of the power converter 200 in order for the power converter 200 to continue to operate without interruption, when the total voltage of the array drops below the predetermined minimum operating voltage due to effects of sunrise, sunset, weather, etc., every switch circuit connected to the parallel circuit may be controlled to be connected to the series circuit.

The sensor unit 210 of the power converter 200 detects a current flowing through the pair of external connection terminals. Current information detected when the switch circuit connects the parallel circuit between the two photovoltaic modules may be transmitted to the control unit 220 to determine whether the switch circuit needs to perform switching to the series circuit or the parallel circuit, or may be transmitted to the intelligent photovoltaic module controller via the communication unit 240. Although the communication unit 240 may be disposed in the power converter, including being embedded in the power converter, it will be understood that the present invention is not limited thereto and the communication unit 240 may be separately installed in an intermediate or remote location of the photovoltaic module array. The communication unit 240 may collectively communicate with all intelligent photovoltaic module controllers connected thereto. The power converter and the intelligent photovoltaic module controller may communicate with each other via a wired or wireless network.

If a problem occurs in one of two photovoltaic modules connected to the photovoltaic module controller, this can significantly influence the magnitude of current generated by the photovoltaic module with the problem. Accordingly, the magnitude of current flowing through the pair of external connection terminals is measured when the two photovoltaic modules are connected to the parallel circuit to be compared with the magnitude of current stored before circuit switching. If the measured magnitude of current is greater than the stored magnitude of current, this indicates that there is a problem with the power generation status of the photovoltaic modules. Even when some photovoltaic modules in the photovoltaic module array are connected to the parallel circuit, a maximum current flowing through the other photovoltaic modules connected to the series circuit does not increase. Accordingly, in a normal situation, even when one intelligent photovoltaic module controller performs switching from the series circuit to the parallel circuit, a total current flowing through the pair of external connection terminals does not increase. However, in a situation where one of the two photovoltaic modules connected to the photovoltaic module controller acts as a bottleneck in the flow of current, switching the two photovoltaic modules to parallel connection can increase a total current flowing through the pair of external connection terminals. As such, decrease in current produced by one photovoltaic module in the photovoltaic module array connected in series causes the magnitude of total current of the array to be limited to a small value, a loss of generated power is incurred due to decrease in total current even when the other photovoltaic modules operate normally. Accordingly, when the magnitude of current detected by the sensor unit 210 after switching to the parallel circuit is greater than the magnitude of current before circuit switching, the switch circuit may be controlled to allow the two photovoltaic modules to stay connected in parallel, thereby preventing the total current of the array from being limited to a small value. Determination as to whether to control the switch circuit to perform switching to the series circuit or allow the two photovoltaic modules to stay connected in parallel may be made based on comparison of a power loss resulting from decrease in total voltage of the array caused by allowing the two photovoltaic modules to stay connected in parallel with a power loss resulting from a situation where the total current of the array is limited to a small value and a current across the other photovoltaic modules operating normally is thus also limited when the two photovoltaic modules are switched back to series connection.

Without comparing the magnitudes of current before and after switching to parallel connection, it is difficult to determine which photovoltaic module is responsible for decrease in current when the photovoltaic modules in the array are connected to the series circuit. Accordingly, a current value detected by the sensor unit 210 needs to be temporarily stored. The control unit 220 controls the switch circuit such that the two photovoltaic modules are periodically connected to the parallel circuit at a predetermined time interval and the sensor unit 210 detects a current flowing through the pair of external connection terminals of each intelligent photovoltaic module controller. Such a circuit switching operation for checking the power generation status may be performed independently by each intelligent photovoltaic module controller, or may be performed sequentially by each photovoltaic module controller based on interaction with other photovoltaic module controllers or in response to a command from the power converter 220 when the intelligent photovoltaic module includes a communication unit 160. Even if there is a voltage difference between photovoltaic modules connected in parallel, this does not cause reverse current since typical commercially available photovoltaic modules are provided with a reverse current prevention circuit.

In addition, the sensor unit 210 of the power converter may detect voltage. That is, when first and second pairs of input terminals of each photovoltaic module are connected to the series circuit, the sensor unit 210 detects the magnitude of voltage applied between the pair of external connection terminals. If the detected magnitude of voltage is less than a predetermined value, this indicates that there is a problem with the power generation status of the photovoltaic module. When there is some difference in insolation between photovoltaic modules, the magnitude of generated voltage is less sensitive thereto than the magnitude of generated current. If the detected magnitude of voltage is significantly low, there is a high possibility that the magnitude of current has also decreased. Accordingly, the control unit 220 controls the switch circuit to connect the first and second pairs of input terminals to the parallel circuit and the sensor unit 210 detects the magnitude of current flowing through the pair of external connection terminals. If there is no significant difference in magnitude of current between before and after switching to parallel connection, the control unit 220 controls the switch circuit to reconnect the first and second pairs of input terminals to the series circuit. When an output voltage of the array drops below a minimum voltage required for the power converter due to sunset or the like and operation of the power converter is interrupted, the switch circuit of each intelligent photovoltaic module controller is stopped while connected to the series circuit.

The intelligent photovoltaic module controller 100 according to the present invention may include a communication unit 160 communicating with the power converter 200 and having a unique identification code (ID). The communication unit 160 transmits information about the magnitude of voltage/current detected by the current sensor 140 or the voltage sensor 150, information about the status of the switch circuit, and the like to the power converter 200 controlling the total output power of the array and may receive a serial/parallel circuit control command.

As described above, a separate sensor unit 210 may be provided to the power converter 200 to detect a total current of the photovoltaic module array input to the power converter. In this case, the current sensor 140 or the voltage sensor 150 may be omitted from the intelligent photovoltaic module controller. Based on a change in current detected by the separate sensor unit 210, the power converter 200 may transmit a command to the communication unit of the photovoltaic module controller, which has a specific identification code (ID), to perform switching between the serial circuit and the parallel circuit. Since the respective pairs of external connection terminals of the photovoltaic module controllers are connected in series, a current flowing through each pair of external connection terminals is equal to a total current of the array input to the power converter. Accordingly, the power converter 200 may transmit a command to the communication unit 160 of a specific photovoltaic module controller to connect two photovoltaic modules connected to the photovoltaic module controller to the parallel circuit, may detect a change in total current of the array after execution of circuit switching, and may control whether to allow the two photovoltaic modules to stay connected to the parallel circuit based thereon. For example, if the total current increases after switching the switch circuit of a specific photovoltaic module controller to the parallel circuit, the power converter 200 allows two photovoltaic modules connected to the photovoltaic module controller to stay connected in parallel based on determination that the two photovoltaic modules act as a bottleneck of the flow of current. If not, the power converter 200 controls the photovoltaic module controller to switch the two photovoltaic modules back to series connection. When the communication unit 160 of the photovoltaic module controller receives a circuit control command from the power converter 200, the control unit 130 may control switching operation of the switch circuit in response to the control command from the power converter, rather than independently controlling switching operation, even when the photovoltaic module controller includes the current sensor 140 and/or the voltage sensor 150.

The intelligent photovoltaic module controller according to the present invention may further include a power supply unit 170 supplying power required for operation of the internal components of the photovoltaic module controller using generated power supplied from the pars of input terminals.

The external connection terminals according to the present invention may be connected to a reverse current prevention circuit preventing reverse current from flowing from outside, wherein the reverse current prevention circuit may include a fuse or a positive temperature coefficient (PTC) thermistor to provide protection from overpower caused by a fault or accident.

According to one embodiment of the present invention, the intelligent photovoltaic module controller may be configured such that the control unit 130 actively determines the presence of abnormalities in photovoltaic modules based on current and/or voltage information detected by the sensors 140, 150. More specifically, the control unit 130 of each intelligent photovoltaic module controller may allow two photovoltaic modules electrically connected to the intelligent photovoltaic module controller to be periodically connected in series at a predetermined time interval and may obtain voltage/current information for comparative purpose through the sensors 140, 150. A magnitude of current flowing though the pairs of external connection terminals when the two photovoltaic modules are connected to the series circuit is equal to a total current of the array. Thus, the magnitude of current is stored as an initial current value. By comparing the initial current value with a magnitude of current flowing though the pairs of external connection terminal pairs when the two photovoltaic modules are switched back to parallel connection, it is possible to determine a change in current due to switching from series connection to parallel connection. The control unit 130 may independently control operation of the switch circuit such that, if a current value substantially increases after switching to parallel connection, the two photovoltaic modules stay connected in parallel and, if not, the two photovoltaic modules are switched back to series connection. If a current flowing through the pair of external connection terminals does not increase after the switch circuit of a certain photovoltaic module controller switches two photovoltaic modules connected to the photovoltaic module to parallel connection, this indicates that there is no problem with the power generation status of the photovoltaic modules connected to the photovoltaic module controller. That is, by allowing each intelligent photovoltaic module controller to sequentially perform switching from the serial circuit to the parallel circuit and check current values detected before and after switching, it is possible to check the power generation status of the photovoltaic modules while minimizing changes in total output voltage of the array.

FIG. 3 is a diagram of the intelligent photovoltaic module controller for series/parallel switching and the power converter according to the present invention.

According to one embodiment of the present invention, the power converter controlling the intelligent photovoltaic module controller may be configured such that the control unit 220 actively determines the presence of abnormalities in photovoltaic modules based on current and/or voltage information detected by the sensor unit 210. More specifically, the control unit 220 may allow two photovoltaic modules electrically connected to each intelligent photovoltaic module controller to be periodically connected in series at a predetermined time interval and may obtain voltage/current information for comparative purpose through the sensor unit 210. A magnitude of current flowing though the pair of external connection terminals when the two photovoltaic modules are connected to the series circuit is equal to a total current of the array. Thus, the magnitude of current is stored as an initial current value. By comparing the initial current value with a magnitude of current flowing though the pair of external connection terminals when the two photovoltaic modules are switched back to series connection, it is possible to determine a change in current due to switching from series connection to parallel connection. The control unit 220 may independently control operation of the switch circuit such that, if a current value substantially increases after switching to parallel connection, the two photovoltaic modules stay connected in parallel and, if not, the two photovoltaic modules are switched back to series connection. If a current flowing through the pair of external connection terminals does not increase after the switch circuit of a certain photovoltaic module controller switches two photovoltaic modules connected to the photovoltaic module to parallel connection, this indicates that there is no problem with the power generation status of the photovoltaic modules connected to the photovoltaic module controller. That is, by allowing each intelligent photovoltaic module controller to sequentially perform switching from the serial circuit to the parallel circuit and check current values detected before and after switching, it is possible to check the power generation status of the photovoltaic modules while minimizing changes in total output voltage of the array.

Accordingly, when multiple photovoltaic modules are provided, there may be provided multiple intelligent photovoltaic module controllers, wherein each intelligent photovoltaic module controller switches electrical connection of two photovoltaic modules connected thereto between series connection and parallel connection. Since each intelligent photovoltaic module controller has a unique identification code (ID), it is possible to easily identify which intelligent photovoltaic module controller is in an abnormal condition and it is sufficient to only check whether there is a problem with two photovoltaic modules connected to the corresponding intelligent photovoltaic module controller among the multiple intelligent photovoltaic module controllers.

According to the present invention, multiple intelligent photovoltaic module controllers may be connected in series via a string 190 to deliver power generated by photovoltaic modules to the power converter and may each independently control series/parallel switching based on information detected by the current sensor 140 and/or the voltage sensor 150. Thus, the intelligent photovoltaic module controller may be applied to photovoltaic modules of an existing photovoltaic power generation system without a separate control device. The number of intelligent photovoltaic module controllers connected to the string 190 may be varied depending on total voltage requirements. In addition, the number of photovoltaic modules connected to one intelligent photovoltaic module controller may be appropriately set depending on the installation environment or capacity of the entire power generation system.

According to the present invention, the power converter controlling the intelligent photovoltaic module controller can prevent a bottleneck of the flow of current due to failure of some photovoltaic modules, an environment thereof, or the like through real-time adaptive control over series/parallel switching of photovoltaic modules. In addition, when a total generated voltage drops below a minimum voltage required for the power converter, the power converter can be prevented from being stopped by switching photovoltaic modules from parallel connection to series connection. A total generated voltage changes little at normal times, despite being highly influenced by environmental changes such as sunrise, sunset, and clouds. However, when a total generated voltage suddenly drops below the minimum voltage required for the power converter, the control unit 220 may control the switch circuit such that the two photovoltaic modules having been connected in parallel due to a change are connected in series, regardless of the change in current.

The power converter 200 according to the present invention may provide information such that an administrator can easily determine the presence of abnormalities in photovoltaic modules 110 belonging to each intelligent photovoltaic module controller 100 through remote monitoring. In this way, upon detection of an abnormal condition in any of the intelligent photovoltaic module controllers, a prompt response including repair of faulty photovoltaic modules is possible, thereby ensuring more efficient power generation and easier system management. The power converter 200 may inform an administrator at a remote location of an abnormal situation via a wireless network subject to predetermined conditions, or may provide information in response to a query from a remote location. In addition, the power converter 200 may transmit a control command to the intelligent photovoltaic module controller to check the power generation status and to perform switching between the series circuit and the parallel circuit based thereon. The power converter 200 may include a sensor unit 210 detecting a total current flowing through the string 190. In this case, since the power converter 200 transmits a control command to the communication unit of the intelligent photovoltaic module based on detection of changes in total current due to circuit switching performed by the intelligent photovoltaic module controller, the current sensor 140 and/or the voltage sensor 150 may be omitted from the controller that operates in response to the control command from the power converter 200.

FIG. 4 is a diagram illustrating one embodiment of the power converter controlling the intelligent photovoltaic module controller according to the present invention. Referring to FIG. 4, 10 intelligent photovoltaic module controllers and 20 photovoltaic modules (maximum voltage 40 V, maximum current 10 A) are installed on each string. When the photovoltaic modules are all connected in series, a total voltage across the string 190 at steady state is 800 V, a current is 10 A, and a total power is 8 kW. When the photovoltaic modules are all connected in parallel, a total voltage across the string 190 is 400 V, a current is 20 A, and a total power is 8 KW (if only some photovoltaic modules are connected in parallel, a total current can be limited to 10 A, rather than 20 A). If a current of one of the photovoltaic modules connected in series decreases to 1 A due to an external environment, a total current can be limited to 1 A, resulting in a significant loss of generated power. Here, when the intelligent photovoltaic module controller 100 connects the abnormal photovoltaic module to normal photovoltaic modules in parallel, it is possible to prevent a total current from being limited to 1 A. In conventional photovoltaic power generation facilities, such an active response is not possible since photovoltaic modules are always connected in series.

The number of intelligent photovoltaic module controllers 100 for series/parallel switching, the number of photovoltaic modules connected to each photovoltaic module controller, and the capacity of the power converter dependent thereon may be varied depending on manufacturer or user choices and thus are not particularly restricted in the present invention.

Although some embodiments have been described herein, it will be understood by those skilled in the art that various other modifications and applications can be made without departing from the spirit and scope of the invention. Such modifications and applications should be construed as falling within the scope of the invention as defined by the appended claims.

The invention claimed is:

1. An intelligent photovoltaic module controller for switching electrical connection between photovoltaic modules each comprising multiple solar cells connected to one another, the intelligent photovoltaic module controller comprising:
   a first pair of input terminals electrically connected to positive (+) and negative (−) terminals of a first photovoltaic module, respectively;
   a second pair of input terminals electrically connected to positive (+) and negative (−) terminals of a second photovoltaic module, respectively;
   a pair of positive (+) and negative (−) external connection terminals electrically connected to a power converter or electrically connected in series to another intelligent photovoltaic module controller;
   a series circuit connected between the first pair of input terminals, the second pair of input terminals, and the pair of external connection terminals such that one terminal of the first pair of input terminals is electrically connected to one terminal of the second pair of input terminals having an opposite polarity thereto and the other terminals of the first and second pairs of input terminals are electrically connected to the positive (+) and negative (−) external connection terminals, respectively;

a parallel circuit connected between the first pair of input terminals, the second pair of input terminals, and the pair of external connection terminals such that the positive (+) and negative (−) terminals of the first pair of input terminals are electrically connected to the positive (+) and negative (−) terminals of the second pair of input terminals, respectively, which, in turn, are electrically connected to the positive (+) and negative (−) external connection terminals, respectively;

a switch circuit performing switching operation to connect a selected one of the series circuit and the parallel circuit between the first pair of input terminals, the second pair of input terminals, and the pair of external connection terminals; and a control unit controlling the switch circuit to perform switching between series connection and parallel connection, wherein, when electrical connection between the first and second photovoltaic modules is switched from the series circuit to the parallel circuit, determination as to whether to switch electrical connection between the first and second photovoltaic modules back to the series circuit is made based on changes in current flowing through the pair of external connection terminals or a string connected to the pair of external connection terminals due to switching to the parallel circuit.

2. The intelligent photovoltaic module controller according to claim 1, further comprising:
a current sensor detecting a magnitude of current flowing through the pair of external connection terminals.

3. The intelligent photovoltaic module controller according to claim 2, wherein, when the control unit controls switching operation of the switch circuit such that the parallel circuit is connected between the first and second photovoltaic modules, the control unit compares a magnitude of current detected by the current sensor with a magnitude of current detected before switching to the parallel circuit and independently controls switching operation of the switch circuit such that, when the magnitude of current measured after switching to the parallel circuit is increased by a predetermined value or more compared to the magnitude of current measured before switching to the parallel circuit, the first and second photovoltaic modules are allowed to stay connected in parallel and, when the magnitude of current measured after switching to the parallel circuit is increased by less than the predetermined value compared to the magnitude of current measured before switching to the parallel circuit, the first and second photovoltaic modules are connected back to the series circuit.

4. The intelligent photovoltaic module controller according to claim 2, wherein the control unit controls switching operation of the switch circuit such that the first and second photovoltaic modules are periodically connected to the parallel circuit at a predetermined time interval to check a status of power generation.

5. The intelligent photovoltaic module controller according to claim 1, further comprising:
a voltage sensor detecting a magnitude of voltage applied between the pair of external connection terminals.

6. The intelligent photovoltaic module controller according to claim 1, further comprising:

a communication unit communicating with the power converter and having a unique identification code (ID), wherein, when the communication unit receives a circuit control command, the control unit controls switching operation of the switch circuit in response to the circuit control command.

7. The intelligent photovoltaic module controller according to claim 1, further comprising:
a power supply unit connected to the first and second pairs of input terminals to supply power required for operation of internal components of the intelligent photovoltaic module controller.

8. The intelligent photovoltaic module controller according to claim 1, further comprising:
a reverse current prevention circuit connected to the pair of external connection terminals to prevent reverse current from flowing from outside, the reverse current prevention circuit comprising a fuse or PTC thermistor to provide protection from overpower due to a fault or accident.

9. A method for controlling an intelligent photovoltaic module controller switching electrical connection between photovoltaic modules each comprising multiple solar cells connected to one another, wherein the intelligent photovoltaic module controller comprises:

a first pair of input terminals electrically connected to positive (+) and negative (−) terminals of a first photovoltaic module, respectively;

a second pair of input terminals electrically connected to positive (+) and negative (−) terminals of a second photovoltaic module, respectively;

a pair of positive (+) and negative (−) external connection terminals electrically connected to a power converter or electrically connected in series to another intelligent photovoltaic module controller;

a series circuit connected between the first pair of input terminals, the second pair of input terminals, and the pair of external connection terminals such that one terminal of the first pair of input terminals is electrically connected to one terminal of the second pair of input terminals having an opposite polarity thereto and the other terminals of the first and second pairs of input terminals are electrically connected to the positive (+) and negative (−) external connection terminals, respectively;

a parallel circuit connected between the first pair of input terminals, the second pair of input terminals, and the pair of external connection terminals such that the positive (+) and negative (−) terminals of the first pair of input terminals are electrically connected to the positive (+) and negative (−) terminals of the second pair of input terminals, respectively, which, in turn, are electrically connected to the positive (+) and negative (−) external connection terminals, respectively;

a switch circuit performing switching operation to connect a selected one of the series circuit and the parallel circuit between the first pair of input terminals, the second pair of input terminals, and the pair of external connection terminals; and a control unit controlling the switch circuit to perform switching between series connection and parallel connection, the method comprising:

detecting a change in current flowing through the pair of external connection terminals when the switch circuit switches electrical connection between the first and second photovoltaic module from the series circuit to the parallel circuit; and determining whether to connect the first and second photovoltaic modules back to the series circuit based on the detected change in current.

10. The method for controlling an intelligent photovoltaic module controller according to claim 9, wherein the step of determining whether to connect the first and second photovoltaic module back to the series circuit comprises:

allowing the first and second photovoltaic modules to stay connected to the parallel circuit when a magnitude of current measured after switching to the parallel circuit is increased by a predetermined value or more compared to a magnitude of current measured before switching to the parallel circuit; and connecting the first and second photovoltaic modules back to the series circuit when a magnitude of current measured after switching to the parallel circuit is increased by less than the predetermined value compared to a magnitude of current measured before switching to the parallel circuit.

11. The method for controlling an intelligent photovoltaic module controller according to claim 9, wherein the step of detecting a change in current comprises detecting a change in current flowing through a string connected to the pair of external connection terminals of the intelligent photovoltaic module controller.

12. The method for controlling an intelligent photovoltaic module controller according to claim 9, further comprising:

controlling, by a control unit of the power converter, switching operation of the switch circuit such that the first and second photovoltaic modules are periodically connected to the parallel circuit at a predetermined time interval to check a status of power generation.

13. The method for controlling an intelligent photovoltaic module controller according to claim 9, wherein:

the intelligent photovoltaic module controller further comprises: a communication unit communicating with the power converter and having a unique identification code (ID); and, when the communication unit receives a circuit control command, the control unit controls switching operation of the switch circuit in response to the circuit control command.

14. The method for controlling an intelligent photovoltaic module controller according to claim 13, further comprising:

communicating with at least two intelligent photovoltaic module controllers installed on the power converter and connected in series via a string connected to respective pairs of external connection terminals thereof to remotely control the at least two intelligent photovoltaic module controllers, wherein the step of determining whether to connect the first and second photovoltaic modules back to the series circuit comprises: allowing the first and second photovoltaic modules to stay connected to the parallel circuit when a magnitude of current measured after switching to the parallel circuit is increased by a predetermined value or more compared to a magnitude of current measured before switching to the parallel circuit; and connecting the first and second photovoltaic modules back to the series circuit when a magnitude of current measured after switching to the parallel circuit is increased by less than the predetermined value compared to a magnitude of current measured before switching to the parallel circuit, and, when the first and second photovoltaic modules are allowed to stay connected to the parallel circuit, a corresponding intelligent photovoltaic module controller is identified by the unique identification code (ID) to provide information about a status of power generation.

15. The method for controlling an intelligent photovoltaic module controller according to claim 14, wherein the step of detecting a change in current flowing through the pair of external connection terminals comprises detecting, by a sensor unit of the power converter, a change in current flowing through the string connecting the at least two intelligent photovoltaic module controllers in series to control each of the intelligent photovoltaic module controllers based thereon.

16. The method for controlling an intelligent photovoltaic module controller according to claim 14, wherein the power converter informs an administrator at a remote location of an abnormal situation subject to predetermined conditions or provides information in response to a query from a remote location.

\* \* \* \* \*